United States Patent
Smith et al.

(10) Patent No.: US 6,359,693 B2
(45) Date of Patent: *Mar. 19, 2002

(54) DOUBLE PASS DOUBLE ETALON SPECTROMETER

(75) Inventors: Scott T. Smith; Alexander I. Ershov, both of San Diego; Jesse D. Buck, San Marcos, all of CA (US)

(73) Assignee: Cymer, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/737,181

(22) Filed: Dec. 14, 2000

Related U.S. Application Data (63) Continuation-in-part of application No. 09/513,324, filed on Feb. 25, 2000, and a continuation-in-part of application No. 09/245,134, filed on Feb. 4, 1999, now Pat. No. 6,243,170.

(51) Int. Cl.[7] .................................................. G01B 9/02
(52) U.S. Cl. ........................................ 356/519; 356/454
(58) Field of Search .................................... 356/454, 519

(56) References Cited

U.S. PATENT DOCUMENTS

| | | | |
|---|---|---|---|
| 3,729,261 A | 4/1973 | Sandercock | 356/112 |
| 4,005,937 A | 2/1977 | Barrett | 356/106 |
| 4,076,422 A | 2/1978 | Kohno | 356/106 |
| 4,850,709 A | 7/1989 | Ban et al. | 356/352 |
| 5,025,445 A | 6/1991 | Anderson et al. | 372/20 |
| 5,243,614 A | 9/1993 | Wakata et al. | 372/29 |
| 5,285,255 A | 2/1994 | Baranne et al. | 356/328 |
| 5,450,207 A | 9/1995 | Fomenkov | 356/416 |
| 5,589,717 A | 12/1996 | Chau | 356/328 |
| 5,757,483 A | 5/1998 | Pierce, III | 356/305 |
| 5,835,210 A | 11/1998 | Ershov | 356/328 |
| 5,991,324 A | 11/1999 | Knowles et al. | 372/57 |

FOREIGN PATENT DOCUMENTS

| | | | |
|---|---|---|---|
| JP | 62203024 | 9/1987 | G01J/3/45 |
| JP | 03173486 | 7/1991 | H01S/3/106 |
| JP | 05007031 | 1/1993 | H01S/3/00 |
| JP | 10300587 | 11/1998 | G01J/9/02 |

OTHER PUBLICATIONS

H. Tsuda, T. Yoshizawa and T. Kurokawa, "Polarisation independent tunable liquid–crystal Fabry–Perot interferometer filter module with double–pass configuration", Electronic Letters vol. 31, No. 10, May 11, 1995.

*Primary Examiner*—Frank G. Font
*Assistant Examiner*—Phil S. Natividad
(74) *Attorney, Agent, or Firm*—John R. Ross, Esq.

(57) ABSTRACT

A first double pass etalon based spectrometer. In a preferred embodiment a second etalon matched to the first double pass etalon is used to produce extremely precise fringe data. Spectral components of a diffused beam are angularly separated as they are transmitted through an etalon. A retroreflector reflects the transmitted components back through the etalon. Twice transmitted spectral components are directed through a second etalon and focused onto a light detector which in a preferred embodiment is a photo diode array. The spectrometer is very compact producing the extremely precise fringe data permitting bandwidth measurements with precision needed for microlithography for both $\Delta\lambda_{FWHM}$ and $\Delta\lambda_{95\%}$.

15 Claims, 12 Drawing Sheets

DOUBLE PASS DOUBLE ETALON SPECTROMETER

This is a continuation-in-part of Ser. No. 09/245,134, filed Feb. 4, 1999, now U.S. Pat. No. 6,243,170 and Ser. No. 09/513,324, filed Feb. 25, 2000.

This invention relates to spectrometers and especially to etalon based spectrometers.

BACKGROUND OF THE INVENTION

Figure 1:
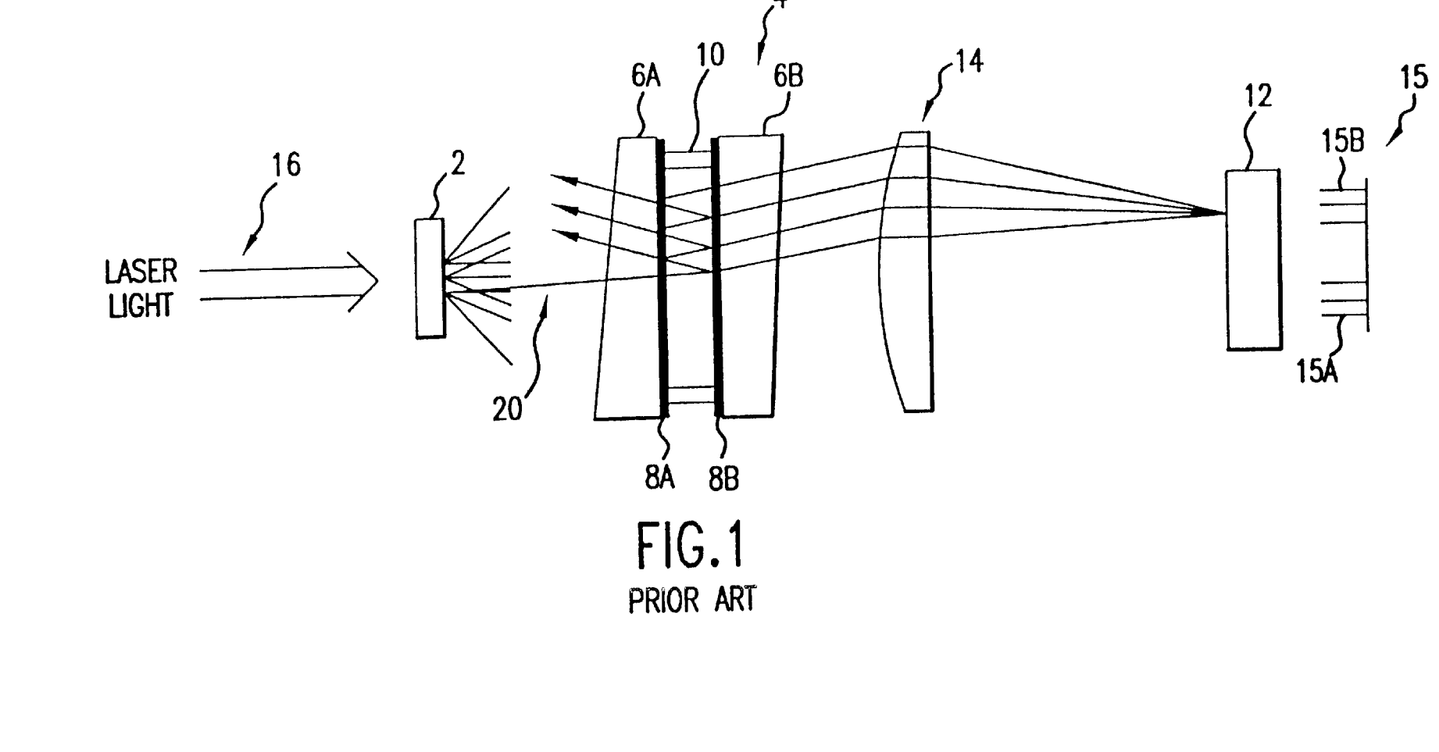
FIG. 1 is a drawing of a prior art spectrometer.

Etalon based spectrometers are well known devices for measuring the intensity of light in a beam as a function of wavelength. FIG. 1 shows the features of a prior art etalon spectrometer used for measurement of wavelength and bandwidth of a laser beam 16. The beam is diffused by diffuser 2 so that rays propagating in a very large number of angles illuminate etalon 4. FIG. 1 shows a single ray 20 being reflected many times within the etalon gap between surfaces 8A and 8B which are coated to reflect about 90%. Spectral components which are transmitted through the etalon are focused by lens 14 onto photo diode array 12. Photo diode array 12 registers a fringe pattern 15 which can be read using electronic data acquisition boards (not shown). The transmission or reflection of light incident on an etalon such as that depicted is well understood and depends on the design of the etalon, particularly the reflectance of the two reflecting surfaces.

Etalon spectrometers are widely used to measure the spectrum of lasers. A particularly important use of etalon spectrometers is to measure the bandwidth of line narrowed excimer lasers such as the line narrowed KrF excimer laser. These lasers are used, for example, as light sources for deep-UV microlithography. There are two spectral characteristics of these lasers which are very important for microlithography applications. These are the spectral bandwidth of the laser measured at 50 percent of the peak intensity, called its full width-half maximum band width (abbreviated $\Delta\lambda_{FWHM}$), and the spectral bandwidth, which contains 95% of laser energy called the 95% integral bandwidth (abbreviated $\Delta\lambda_{95\%}$). It is very important that the laser is always operating within specifications during microlithography chip manufacturing because spectral broadening would cause blurring of the integrated circuits being printed on silicon wafers which will result in yield problems. Therefore, it is very important to provide continuous monitoring capabilities for the laser spectrum.

The prior art etalon spectrometer is capable of accurately measuring $\Delta\lambda_{FWHM}$ values, and is currently used for this purpose in production microlithography lasers, such as manufactured by CYMER, Inc. (San Diego, Calif.). However, prior art etalon spectrometers are not very suitable for accurately measuring $\Delta\lambda_{95\%}$ values. Typical production quality KrF excimer lasers should have a $\Delta\lambda_{FWHM}$ of about 0.6 pm and $\Delta\lambda_{95\%}$ of about 2 pm, if operating properly.

Figure 2:
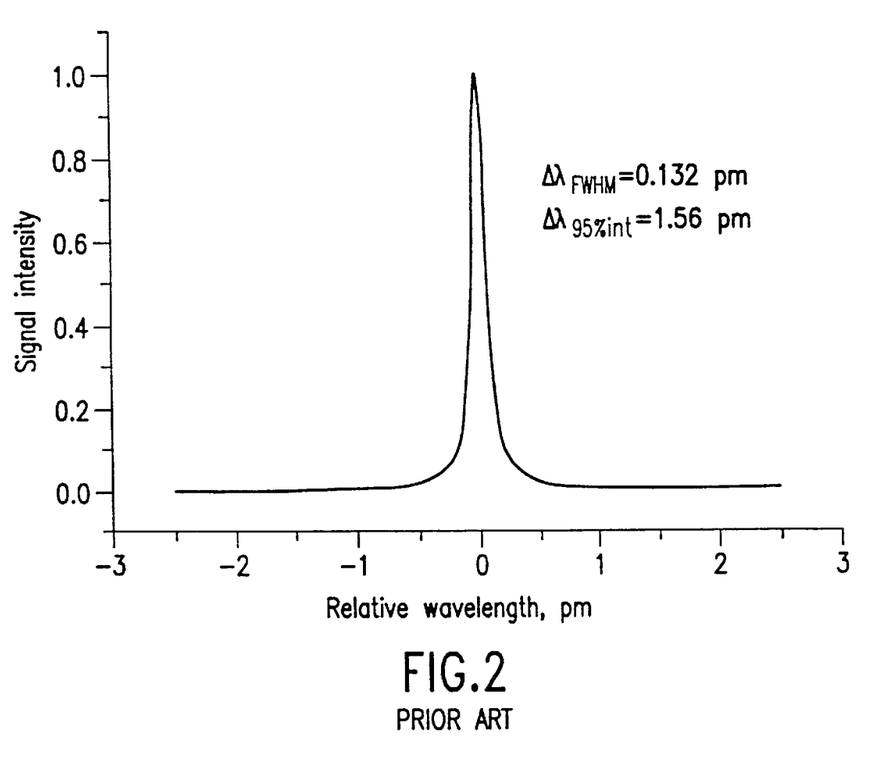
FIG. 2 is a graph of the slit function of a prior art etalon spectrometer.

FIG. 2 shows the calculated slit function spectrum of a typical prior art etalon having a free spectral range (FSR) of 5 pm and a coefficient of finesse (finesse) of 38. (The terms FSR and finesse are defined and explained in a variety of optic texts such as OPTICS by Eugene Hecht/Alfred Zajae published by Addison-Wesley, Reading, Mass.) The slit function spectrum of FIG. 2 can be derived from one of the peaks of fringe pattern 15. The calculation graphed in FIG. 2 assumes that the light illuminating the etalon is monochomatic (i.e., an infinitely narrow bandwidth). If such an etalon is used to measure the bandwidth of a laser beam, the slit function bandwidth of the etalon is a source of error and contributes to uncertainty or error in the measurement. The calculated FWHM bandwidth for this prior art etalon is 0.13 pm and the 95% integral bandwidth for the etalon is about 1.5 pm.

For the etalon to accurately measure spectrum of a real laser, the slit function bandwidth of the etalon itself should be substantially smaller than the laser bandwidth. While this condition is satisfied for $\Delta\lambda_{FWHM}$ measurements, where etalon slit function FWHM of 0.13 pm is substantially smaller than typical laser $\Delta\lambda_{FWHM}$ of about 0.6 pm, the same is not true for $\Delta\lambda_{95\%}$ measurements, where etalon slit function bandwidth of about 1.5 pm is a substantial fraction of the expected laser bandwidth of about 2 pm.

Therefore, if the prior art etalon spectrometer with the FIG. 2 slit function is used to measure $\Delta\lambda_{95\%}$, a complicated numerical analysis is needed to deconvolve the real $\Delta\lambda_{95\%}$ value. Such analysis is prone to errors and ambiguous results, so no reliable $\Delta\lambda_{95\%}$ information is available during the microlithography process. As a result, a laser can go out of specification unnoticed. This can lead to very expensive yield problems and should be avoided.

Another way of accurately measuring laser spectrum is to use a high resolution grating spectrometers. These instruments can provide accurate spectral measurement including accurate $\Delta\lambda_{95\%}$ measurements, but are very bulky and expensive. These instruments are successfully used in the laboratory but are not well suited for production line microlithography use.

What is needed is a compact spectrometer, capable of accurate measurement of both $\Delta\lambda_{FWHM}$ and $\Delta\lambda_{95\%}$, which can be built as a part of internal laser diagnostic set, so that it can be used in the field during the microlithography process.

SUMMARY OF THE INVENTION

The present invention provides a first double pass etalon based spectrometer. In a preferred embodiment a second etalon matched to the first double pass etalon is used to produce extremely precise fringe data. Spectral components of a diffused beam are angularly separated as they are transmitted through an etalon. A retroreflector reflects the transmitted components back through the etalon. Twice transmitted spectral components are directed through a second etalon and focused onto a light detector which in a preferred embodiment is a photo diode array. The spectrometer is very compact producing the extremely precise fringe data permitting bandwidth measurements with precision needed for microlithography for both $\Delta\lambda_{FWHM}$ and $\Delta\lambda_{95\%}$.

DETAILED DESCRIPTION OF THE PREFERRED EMBODIMENTS

First Preferred Embodiment

Figure 3:
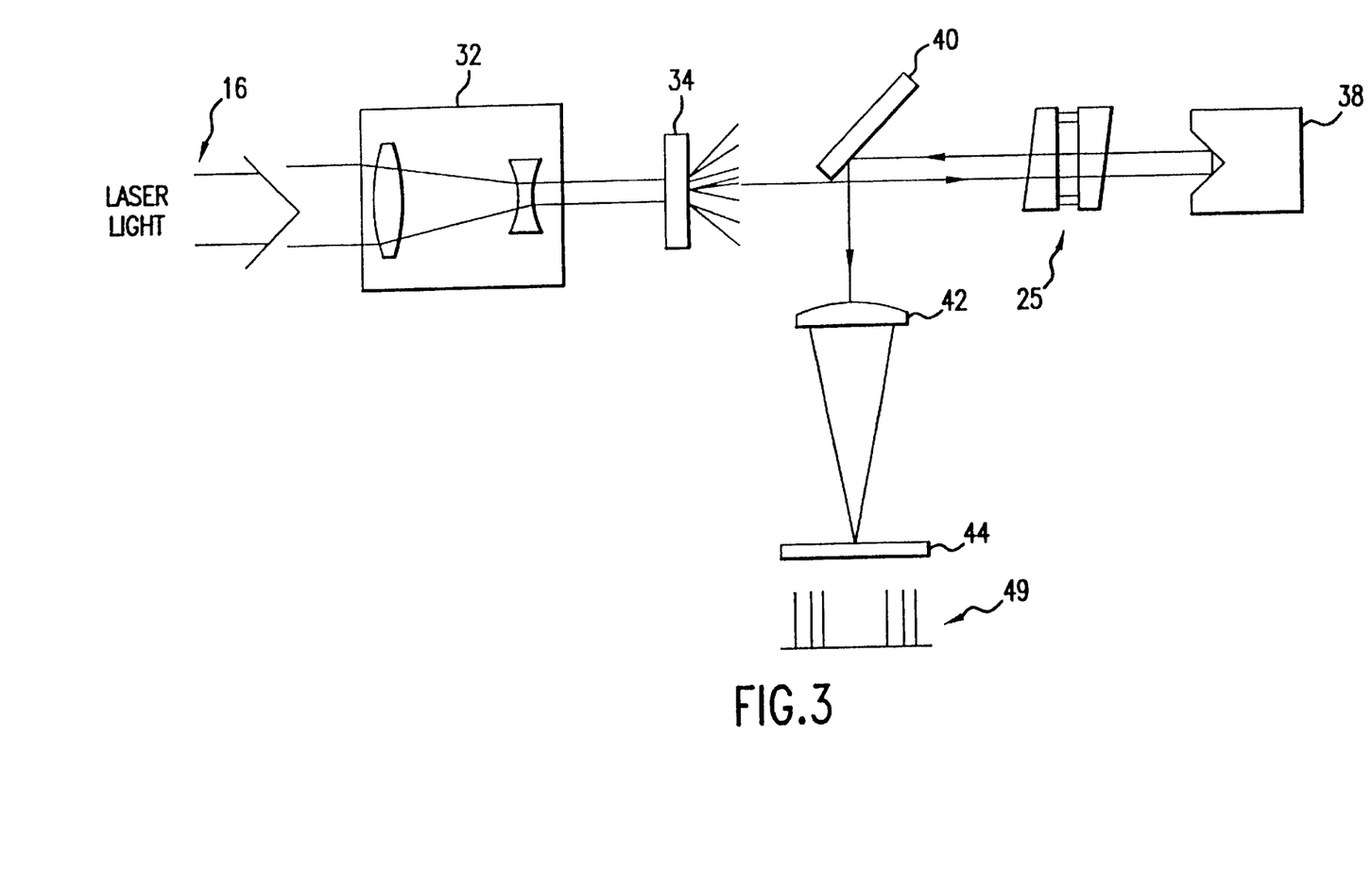
FIG. 3 is a drawing of a first preferred embodiment of the present invention.

FIG. 3 shows a preferred embodiment of the present invention. A laser beam 16, whose size is reduced three times using telescope 32 illuminates diffuser 34. Light scattered from diffuser 34 illuminates etalon 25. Hollow retro-reflector 38 is used to return the beam back to the etalon for the second pass. Each component of the beam is reflected at exactly or almost exactly 180-degrees for a second pass through etalon 25 but there are small displacements of the reflected components. These small displacement permit the use of a 45-degree mirror 40 which reflects beam components after double-passes through the etalon, but allows passage of a sufficient portion of the incoming beam. The reflected beam components are focused by lens 42 with a 1 meter focal length onto linear photo diode array (PDA) 44, where a fringe pattern 49 is detected. The preferred PDA is a 2048 element, 14$\mu$×14$\mu$ array available from supplier such as EG&G, Inc., Sunnyvale, Calif.

The fringe pattern 49 consists of multiple peaks located in the same position as the peaks 15 of prior art etalon of FIG. 15. The difference though is that the peaks of the etalon of the present invention more closely match the actual laser spectrum because of improved resolution of etalon spectrometer in this double pass configuration.

Prototype double pass etalon spectrometers based on the FIG. 3 design have been assembled and tested by Applicant with excellent results.

Figure 4:
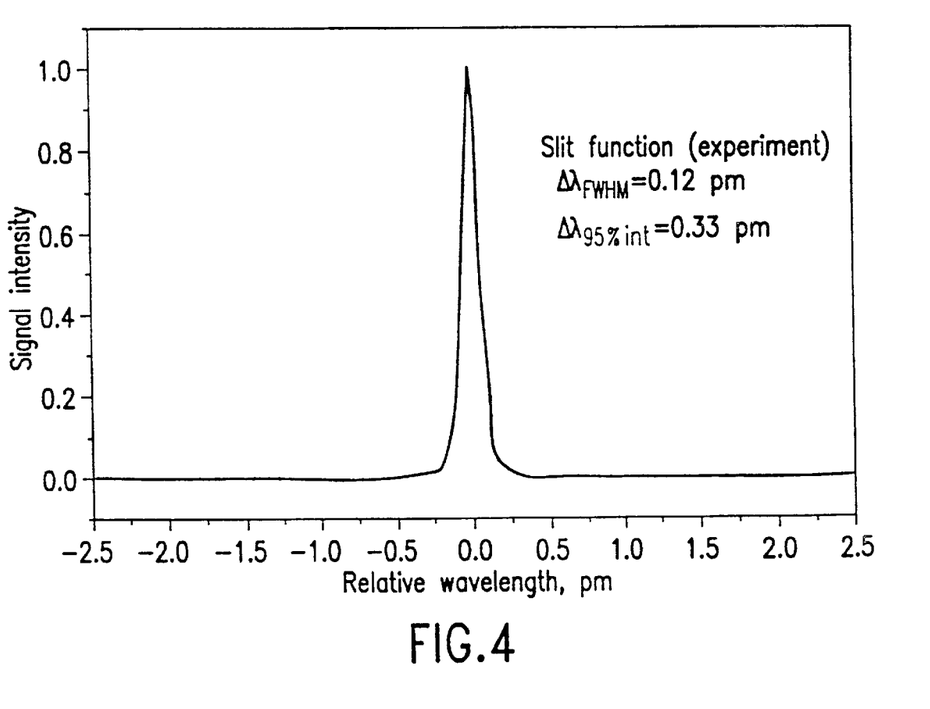
FIG. 4 shows the spectrum of a frequency doubled Ar-ion laser beam measured with the FIG. 3 embodiment.

FIG. 4 shows a spectrum (recorded with PDA 44) of the beam from a frequency doubled Ar-ion cw laser which emits light at 248.25 with an extremely narrow spectral bandwidth of only about 0.003 (FWHM). (The light spectrum from this laser is narrow enough to be considered monochomatic for purposes of testing etalons with bandwidths in the ranges greater than 0.1 pm.) The FWHM bandwidth recorded by PDA 44 (as shown in FIG. 3) was about 0.12 pm with a 95 percent integral value of 0.33 pm. The theoretical values for two perfect etalons in series under the above conditions would be 0.09 pm (FWHM) and 0.25 (95% integral). These results show that bandwidth resolutions in the range of 0.1 pm for FWHM and about 0.3 for the 95% integral are obtainable with the FIG. 3 double pass etalon spectrometer.

Applicant has compared a typical spectrum of a microlithography KrF laser measured with a high resolution grating spectrometer and a compact spectrometer of the present invention. The grating spectrometer had a slit function of about 0.12 pm at FWHM level and was manufactured by CYMER, Inc. with offices in San Diego, Calif. for the purpose of testing KrF excimer lasers. Very good agreement between the results obtained with etalon spectrometer and grating spectrometer were obtained. The FWHM value of the laser bandwidth was 0.65 pm and 0.62 pm as measured by double pass etalon of the present invention and grating spectrometers respectively, while 95% integrated value of the bandwidth is 1.67 pm and 1.70 pm as measured by double pass etalon spectrometer of the present invention and high resolution grating spectrometer, respectively.

The double pass etalon spectrometer of the present invention creates a fringe pattern similar to conventional etalon spectrometer the differences being that the fringes correspond to actual spectrum more closely and are less convolved by etalon resolution. Therefore, any of the well known techniques can be used to analyze the fringe pattern. This etalon spectrometer can also be used in combination with a relatively low resolution grating spectrometer to render accurate center wavelength measurements. Such applications are described, for example, in U.S. Pat. Nos. 5,025,445 and 5,450,207. The etalon spectrometer alone cannot do the absolute wavelength measurements; therefore, a method to calibrate the etalon data is needed. A plurality of center wavelengths can be obtained from the etalon separated exactly by the free spectral range (FSR) of the etalon. In the preferred embodiment, the FSR is about 5 pm. In order to be able to determine the correct center wavelength value using the precise etalon data, a low resolution grating spectrometer may be used as explained in U.S. Pat. No. 5,025,445. The resolution of that grating spectrometer can be about half of the FSR, therefore, a unique center wavelength value can be chosen. A preferred calibration technique is described in U.S. Pat. No. 5,450,207.

Second Preferred Embodiment

Figure 5:
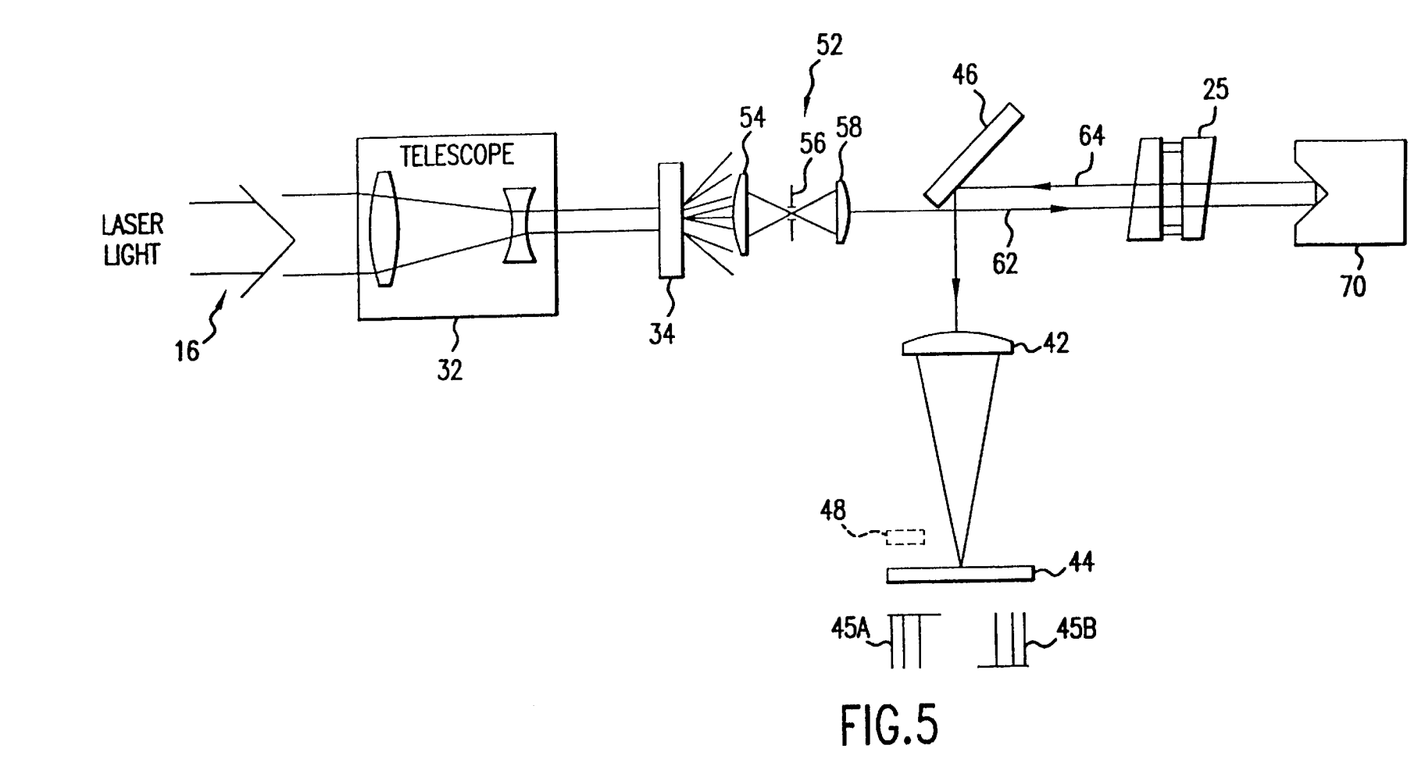
FIG. 5. is a drawing of the second preferred embodiment of the present invention.

A second preferred embodiment of the present invention is shown in FIG. 5.

A laser beam 16 illuminates diffuser 34 after being reduced in size by telescope 32 in a way similar to the first embodiment. In the second embodiment, however, a spatial filter 52 is used to select a portion of diffused light. The spatial filter 52 consists of two lenses 54 and 58 with a focal length of 10 cm each, separated by a distance, twice the focal length, or about 20 cm. An aluminum aperture 56 with a diameter of about 0.1 cm is placed at the focus of lens 54. The purpose of spatial filter 52 is to select a fan of rays coming from a diffuser within an angle (spatial frequencies) of about 0.01 steradian. This filtered fan of rays is incident on beam splitter 46. Beam splitter 46 is a partially reflecting mirror, which transmits about 50% of the light and reflects the rest away (not shown). The portion of diffused light 62, which passes through beam splitter 46, illuminates etalon 25. Light passing through etalon 25 is reflected by hollow retroreflector 70 which returns the beam back to the etalon for the second pass. This reflected portion of the beam is shown as 64. Each component of the beam is reflected at exactly or almost exactly 180-degrees for the second pass through the etalon 25.

About 50% of the portion of the beam 64 passing through the etalon 25 is reflected by beam splitter 46. This reflected portion is focused by lens 42 having a 1 meter focal length onto linear PDA array 44, where a fringe pattern is detected.

Figure 7:
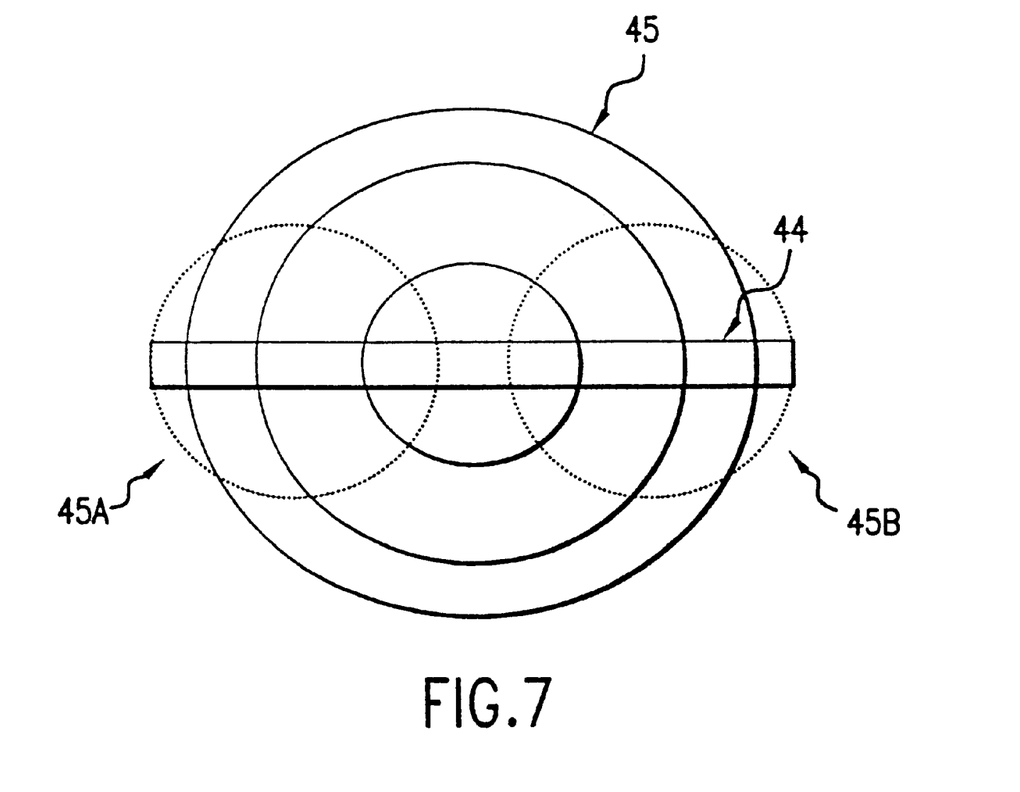
FIG. 7 shows a fringe pattern on photo diode array.

In this embodiment, etalon 25 is tilted at a small angle of about 0.01 rad. relative to the axis of the incoming fan beam transmitted through spatial filter 52. As a result, there are two sets of fringes registered by PDA 44. On one side of the PDA there is a fringe set 45B depicted on FIG. 5 which is a set of fringes created by beams passing through etalon 25 two times. On the other side of PDA 44, however, there is a different set of fringes. These fringes 45A also depicted on FIG. 5 are created by a portion of original beam 62 reflected by etalon 25 on the first pass. This set of reflection fringes look different than fringe set 45B. Fringes 45A are dips, while fringes 45B are peaks. Because intensity of the beam after double pass through the etalon might be significantly smaller, then intensity of the beam reflected from the etalon, an optional light reducing filter 48 can be placed over the portion of the PDA, where fringe set 45A is formed. This optional filter 48 can be a neutral density filter with transmission of about 30%. FIG. 7 shows the relative orientation of fringes 45A and 45B on PDA 44. If there were no spatial filter 52 and etalon 25 had not have been tilted, both reflection fringes 45A and double transmission fringes 45B would have been created as concentric circles in the plane of PDA 44. The diameters of these circles for fringes 45A and 45B would have been exactly the same, therefore they would tend to cancel each other. The purpose of spatial filter 52 is to limit light available for fringes so that only a portion of circle 45 is formed. The purpose of tilting the etalon is to separate the portions of the circle 45 created by reflected (45A) and transmitted (45B) beams as is shown in FIG. 7. Therefore, PDA 44 detects portions of both reflected and transmitted circles but the array detects the left side of one circle and the right side of the other circle.

Because positions of the dips 45A are exactly at the same place where peaks of the conventional etalon spectrometer should be, the double pass etalon spectrometer is capable of all measurements the conventional etalon spectrometer is capable of. Thus, fringes 45B can be used to analyze spectrum shape, while the actual wavelength is determined by a diameter of fringe 45 (FIG. 7) together with calibration data. In a conventional etalon spectrometer, this diameter is determined as a distance between peaks 15A and 15B (FIG. 1). In the etalon of the present invention, this diameter is determined as a distance between peaks 45B and corresponding dips 45A (FIG. 5). Therefore, all the prior art techniques for determining the spectral shape and center wavelength information can be used with the etalon of the present invention as well.

Third Preferred Embodiment

Figure 8:
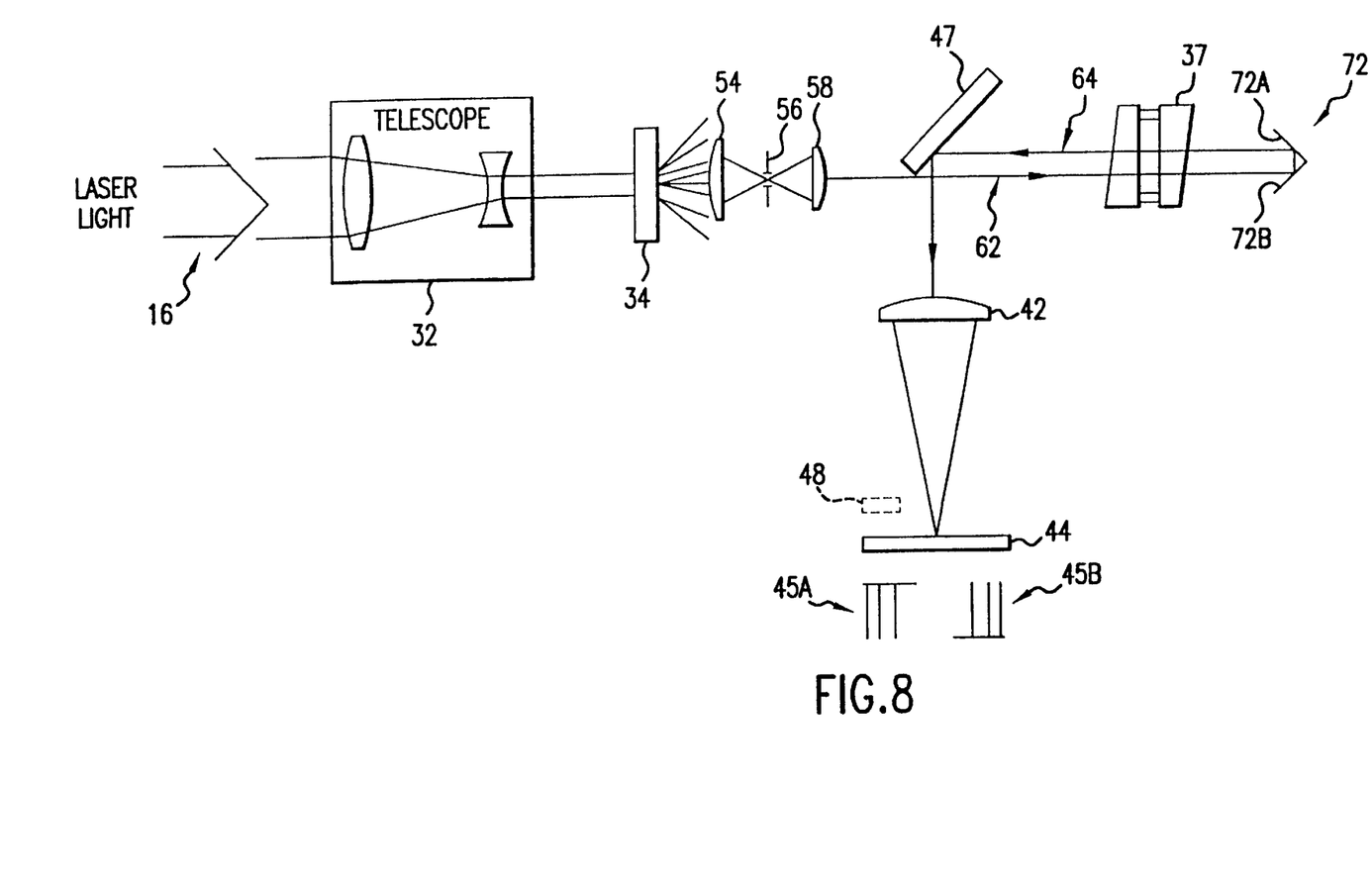
FIG. 8 is a drawing of the third preferred embodiment of the present invention.

A third embodiment of the present invention is shown in FIG. 8.

This embodiment is just like the second referred embodiment shown in FIG. 5 except:

1) 45 degree 50% beam splitting mirror is replaced with a polarizing beam splitter 47. This beam splitter is arranged to maximum transmit the predominant polarization of the laser light and reflect the other polarization.
2) hollow retroreflector 70 is replaced with a hollow prism 72. This prism is created by two reflected rectangular mirrors 72A and 72B coated with material which efficiently reflect the laser light. The line 72C (shown in FIG. 9 described below) at which plane 72A and 72B cross is aligned at an angle of about 45 degrees to the polarization of the beam 62 transmitted through the polarizing beam splitter 47.

Figure 9:
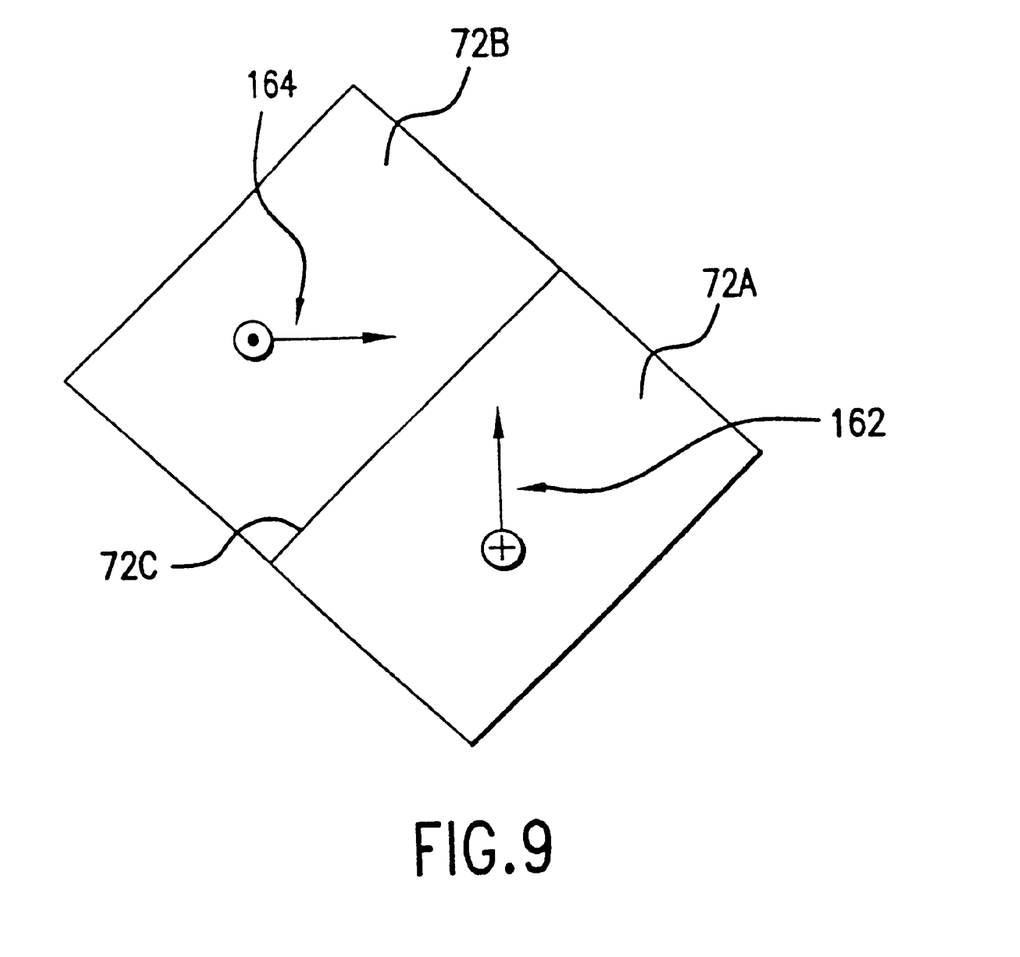
FIG. 9 is a drawing of a polarization rotating hollow prism.

FIG. 9 shows the prism 72 as seen along direction of the beam 62 (FIG. 8). FIG. 9 shows the orientation of the polarization 162 of the beam 62 (shown in FIG. 8) relative to line 72C, as well as polarization 164 of the reflected light. This polarization 164 is rotated by 90 degrees after being reflected back by hollow prism 72. Going back to FIG. 8, this back reflected light goes through the etalon 37 for the second time just like in the second embodiment (FIG. 5). Because of its 90 degrees rotated polarization, this double pass beam 64 will now be reflected by polarizing beam splitter 47 and focused by lens 42 onto PDA array 44 to form fringe patterns 45A and 45B similar to the second embodiment (FIG. 5).

In the present embodiment, though, the amplitude of the signal detected by PDA 44 is higher because of higher throughput, provided by polarizing beam splitter 47 as compared with 50% reflector 46 in the second embodiment (FIG. 5). The fringe pattern in this embodiment, however, is similar to that of the second embodiment, therefore, all the same techniques for measuring spectrum shape and center wavelength can be used with this embodiment as well. Many lasers, such as excimer KrF lasers used for microlithography, produce highly polarized light, therefore, the use of this third embodiment will significantly (up to 2–3 times) increase the signal. The preferred polarizing beam splitter 47 will have about 90% transmission for one polarization and more than 97% reflection for the other.

The reader should appreciate that all three embodiments have the advantage in that the light goes twice through the same etalon. Therefore, assuming the reflecting surfaces are very parallel, essentially the same spacing between the plates of the etalon is guaranteed for both passes.

Figure 6:
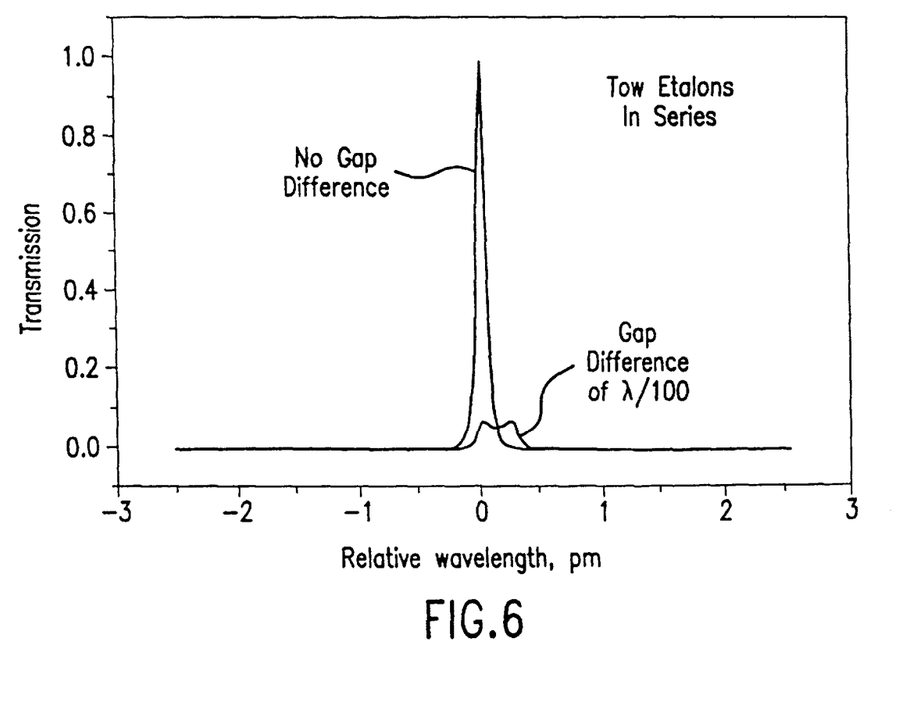
FIG. 6. shows the effect of a very small etalon plate mismatch.

In any series etalon spectrometer arrangement precise matching of etalon spacing is extremely important. For 248 nm light a spacing difference between the plates of the etalon as small as 6.33 nm (1/100 of the 633 nm frequency doubled, Ar-ion laser wavelength) substantially destroys the resolution of the spectrometer. The results of such spacing difference is shown in FIG. 6, the heavy curve showing the results of the 6.33 nm spacing difference and the light curve representing the two etalon spectrum with perfectly matched spacings. It is extremely difficult to have two etalons with spacings (which are typically in the range of 1–15 mm) matched to 6 nm. With a one etalon as in the etalon spectrometer of the present invention, the gap for two passes remains the same as long as the etalon is of good quality with precisely parallel reflecting surfaces. The Applicant has tested first and second embodiments with great success.

Fourth Preferred Embodiment

Figure 10:
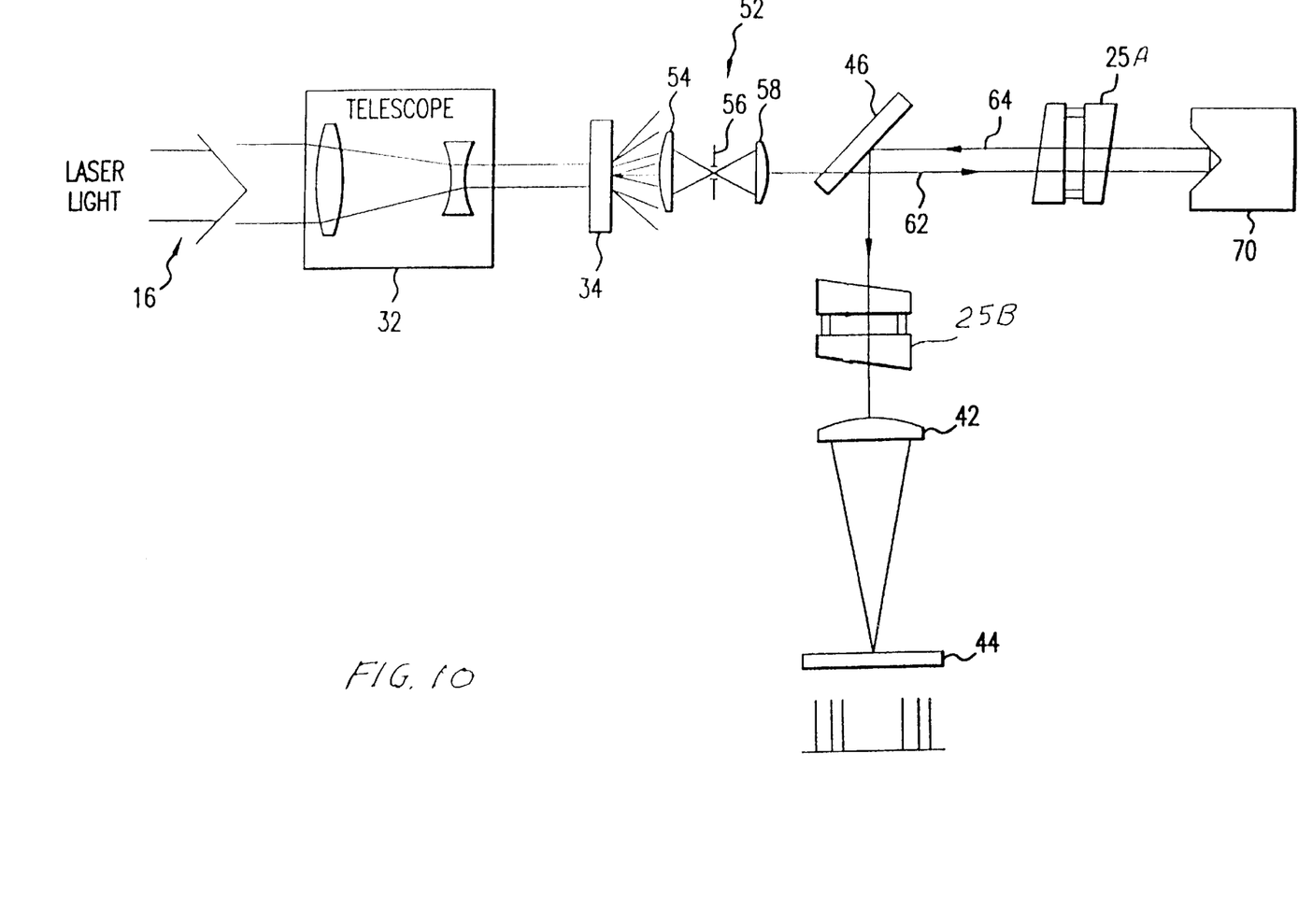
FIG. 10 is a drawing of a fourth preferred embodiment of the present invention.

A fourth preferred embodiment of the present invention is shown in FIG. 10. This embodiment is substantially the same as that shown in FIG. 5 and described above as the first preferred embodiment except that a second etalon has been added to the system. The double pass etalon is designated as 25A and the second etalon which is a single pass etalon is designated as 25B. In this embodiment, reducing telescope 32 is a 3:1 reducing telescope, diffuser 34 is a small defractive diffuser, double pass etalon 25A is a 10 pm etalon, retroreflector 38 is a hollow corner cube, etalon 25B is a 2 pm etalon and lens 42 is a 1.5 m lens. Spacial filter selects a fan or rays and removes any zero order component which could distort the spectrum. Fold mirrors (not shown) permits the entire system to fit on a 2 foot by 1 foot optical breadboard.

To align the transmission functions of the two etalons to a precise ratio of 5 required etalon tuning. The 2 pm etalon was an air spaced etalon and was pressure tuned to match the 10 pm etalon. The pressure tuning was accomplished by enclosing the etalon in a sealed housing and connecting it to an adjustable bellows by an air line. By compressing the bellows the air pressure and therefore the FSR of the etalon could be adjusted. It was found that the temperature stability of the laboratory used was not adequate for the solid 10 pm etalon. To increase the stability of the 10 pm etalon, a temperature control assembly was built. The assembly was composed of a resistive heating element, a resistive temperature sensor, and a temperature control module.

Figure 11:
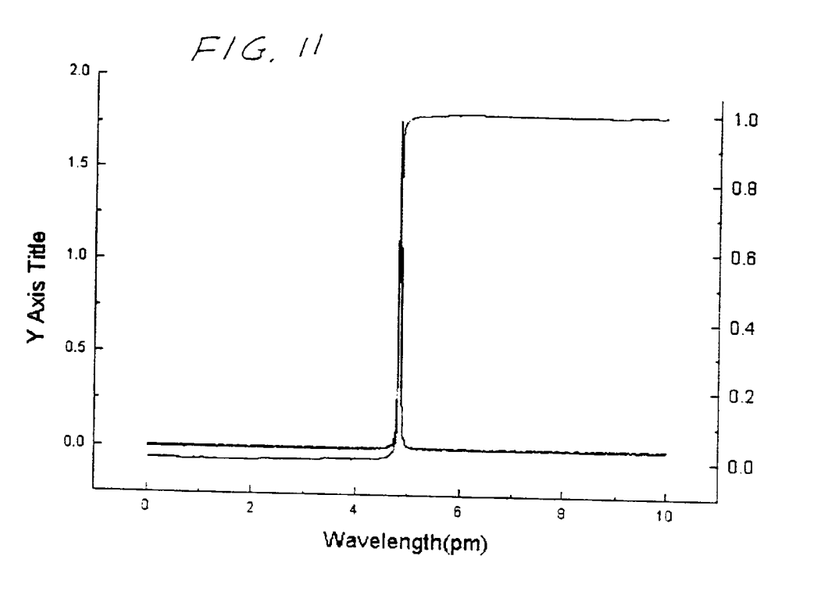
FIGS. 11 and 12 are test results from the fourth preferred embodiment.
Figure 12:
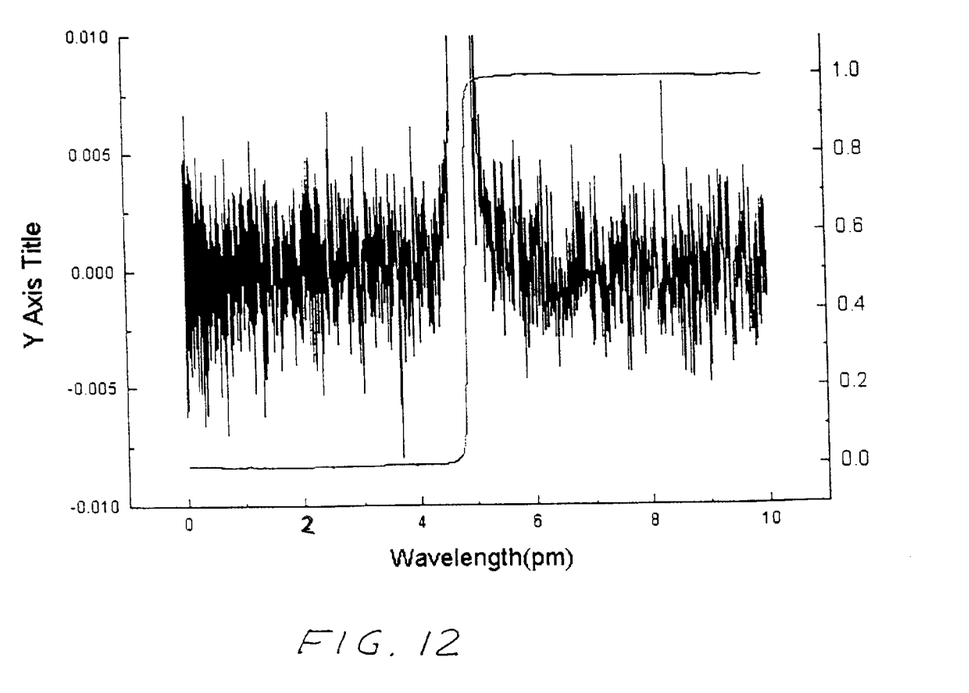

Testing of the impulse response of the multi-pass, multi-etalon (MPME) spectrometer was conducted by using the FreD laser as a monochromatic source. A 1024 element, Hamamatsu, linear photo-diode array (PDA) and a digitizing oscilloscope recorded the fringe pattern produced by the spectrometer. In addition to the fringe image, a dark level image was recorded. Each of the two files represented the average of 60 frames of the PDA running at a line rate of about 90 hz. The integration time of each frame was approximately 10.5 ms. The recorded images were processed by subtracting the dark level image from the fringe image and fitting a base line to the resulting data. The resulting data was then graphed in FIG. 11. FIG. 12 shows a magnified view of the noise.

The experimental transmission function recorded matches closely with the modeled function for the MPME spectrometer. The slightly superior FWHM performance of the spectrometer over the modeled value may have been produced by a higher finesse value of one or both of the etalons than the modeled value of 30.

The preferred embodiment of the spectrometer would have both etalons to be of the air spaced type and to have the tuning accomplished by pressure tuning the 10 pm etalon. This would increase the temperature stability of the spectrometer and eliminate the need for pressure tuning the 2 pm etalon. By tuning the 10 pm etalon, the variability of the position of the first fringe would also be reduced. Since the FSR of an etalon bounds the position of a fringe with regards to wavelength, tuning the 10 pm etalon would set the variability to 2 pm. With lower fringe position variability, a more consistent integration range for calculating the integrated 95% width can be maintained for all wavelengths.

It should also be noted that the linear PDA used is limiting the resolution of the spectrometer. The 25 micron size pixels were comparatively large to the width of the fringe pattern produced. To alleviate this problem the size of the fringe pattern was magnified by using a longer 1.5 meter focal length lens. At this magnification the diameter of the first fringe when positioned 5 pm from the center is too large to be imaged by the detector. The entire PDA only covers a radial section of the fringe pattern that translates to about 12 pm in wavelength space. Even at this maximum magnification the FWHM of the fringe is 3 pixels or less. Therefore to utilize the full resolution of this spectrometer design would require a linear array with at least 2048 pixels.

The practical limitations of this type of design sets the maximum ratio between etalon gaps at about 10. When the gap ratio of two etalons exceed 10, the proximity of the first subsidiary peak to the designed pass band causes a substantial increase in the integrated 95% width. Using this gap ratio guideline and the additional constraint of a minimum FSR of 10 pm, sets the highest resolution multi-pass, multi-etalon spectrometer to a device using a 10 pm etalon and 1 pm etalon. The theoretical transmission function of such a device with an estimated finesse value of 30 for both etalons produces a FWHM of 0.03 pm and an integrated 95% of 0.15 pm.

Fifth Preferred Embodiment

Figure 13:
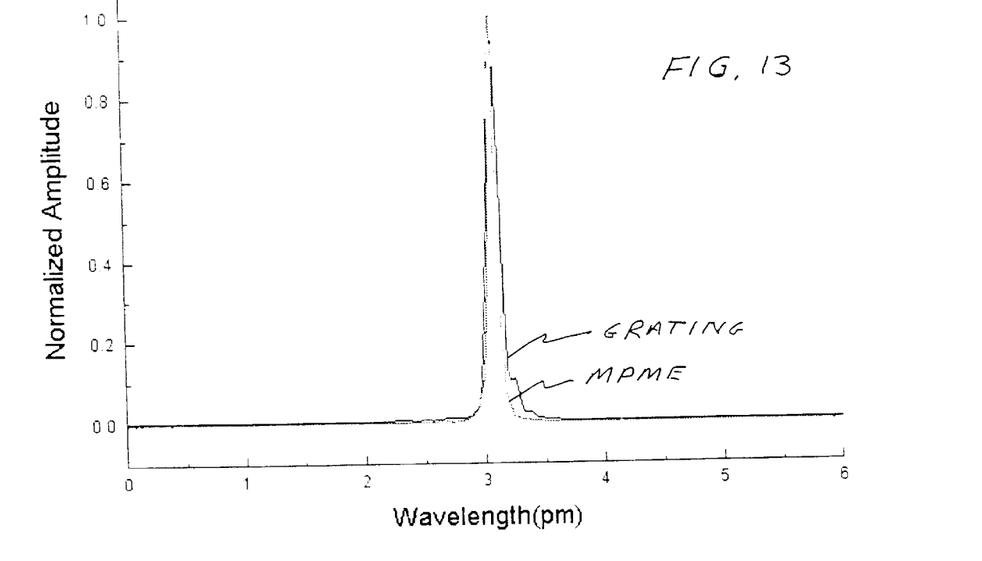
FIGS. 13 and 14 show a comparison of test results of a MPME spectrometer with a grating spectrometer.
Figure 14:
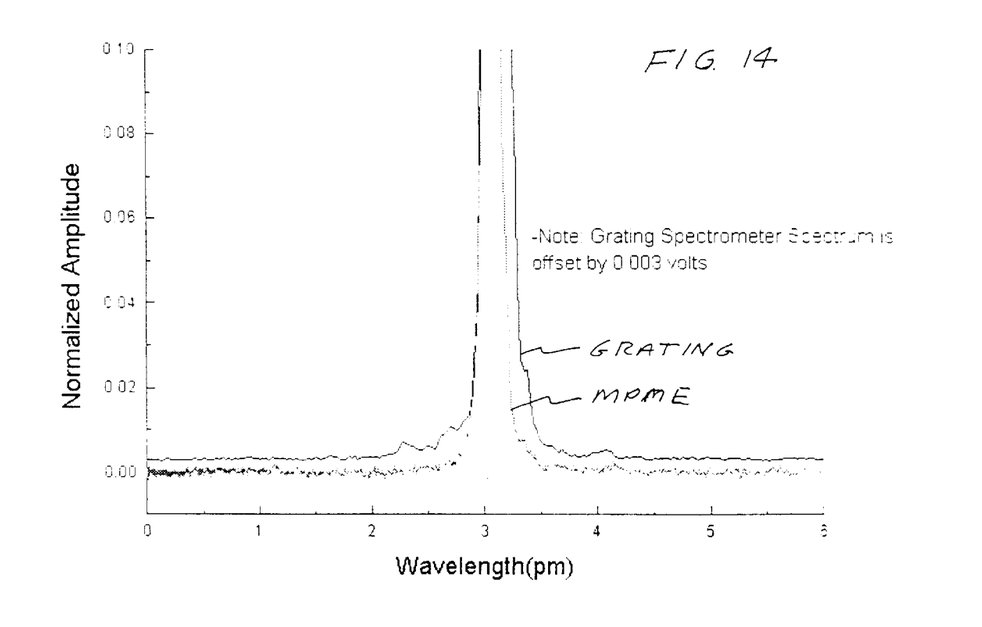

In a fifth embodiment built and tested by Applicant is one in which a 2 pm single pass etalon was combined with a 20 pm double pass etalon and the MPME system was used to measure bandwidth of a KrF laser beam and the results were compared with similar results using a state of the art precision grating based spectrometer. Raw results are shown in FIGS. 13 and 14. FIG. 14 is a magnified portion of FIG. 13. These graphs show the much more compact MPME has substantially higher resolution than the grating spectrometer.

Persons skilled in the art can recognize that other modifications can be done without departing from the spirit of the present invention. For example, a scanning exit slit and a photometer can be used instead of photo diode array if fast response is not a requirement. This slit-photometer assembly can scan the area of the PDA and measure the light intensity at different wavelengths. The second single pass etalon could be combined with double pass etalon arrangement shown in FIGS. 3 and 8 as well as the one shown in FIG. 5. Also, the features described in the fourth and fifth embodiments could be combined with the teachings of patent application Ser. No. 09/513,325, filed Feb. 25, 2000 which is incorporated herein by reference. Therefore, the invention is only to be limited by the claims and their legal equivalents.

What is claimed is:

1. A double pass, double etalon based spectrometer for making spectral measurements of a beam, said spectrometer comprising:
    A) a diffusing optic for directing light in said beam in a very large number of directions, to produce a diffuse beam;
    B) a first etalon positioned in said diffuse beam and configured to transmit portions of said beam to produce a once transmitted beam having angularly separated spectral components;
    C) a retro-reflector positioned to reflect at least a portion of said once transmitted beam back through said etalon to produce a twice transmitted beam having angularly separated spectral components;
    D) a second etalon;
    E) a focusing optic;
    F) a light detector;
    G) a reflecting optic positioned to reflect at least a portion of said twice reflected beam through said second etalon, said focusing optic onto said light detector wherein spectral components of said beam are detected by said light detector.

2. A spectrometer as in claim 1 wherein said retro-reflector is a hollow retro-reflector.

3. A spectrometer as in claim 1 wherein said retro-reflector is a hollow rectangular prism.

4. A spectrometer as in claim 3 wherein said hollow prism is comprised of two mirrors coated to reflect light within a selected wavelength range.

5. A spectrometer as in claim 1 wherein said reflecting optic is a mirror positioned to reflect said twice transmitted beam but permit transmittal of at least a portion of said diffuse beam to said etalon.

6. A spectrometer as in claim 3 wherein said diffuse beam defines a primary polarization direction said reflecting optic is a polarizing beam splitter and said hollow prism is comprised of two intersecting reflected plates defining a cross-line at their intersection, said two plates being positioned at a 90 degree angle relative to each other and the cross-line of the said plates is positioned at an angle of about 45 degrees to the primary polarization direction of said diffuse beam.

7. A spectrometer as in claim 6 wherein said hollow prism is comprised of two mirrors coated to reflect light within a selected range of wavelengths.

8. A spectrometer as in claim 1 wherein said light detector is a detector array.

9. A spectrometer as in claim 8 wherein said detector array is a linear photo diode array.

10. A spectrometer as in claim 1 and further comprising a spatial filter positioned between said diffusing optic and said etalon.

11. A spectrometer as in claim 10 wherein said spatial filter comprises a slit and a first lens for focusing at least a portion of said diffuse beam through said slit.

12. A spectrometer as in claim 11 and further comprising a second lens for collimating diffuse lights passing through said slit.

13. A spectrometer as in claim 1 wherein said second etalon is aligned to a precise integer ratio with said first etalon.

14. A spectrometer as in claim 13 wherein said ratio is 5.

15. A spectrometer as in claim 14 wherein said first etalon has a transmission function of about 10 and said second etalon has a transmission function of about 2.

* * * * *

UNITED STATES PATENT AND TRADEMARK OFFICE
CERTIFICATE OF CORRECTION

PATENT NO. : 6,359,693 B2
DATED : March 19, 2002
INVENTOR(S) : Scott T. Smith et al.

It is certified that error appears in the above-identified patent and that said Letters Patent is hereby corrected as shown below:

Column 8,
Line 32, delete "reflected" and insert -- transmitted --.

Signed and Sealed this

First Day of April, 2003

JAMES E. ROGAN
*Director of the United States Patent and Trademark Office*